United States Patent [19]

Oushiden et al.

[11] Patent Number: 5,043,766

[45] Date of Patent: Aug. 27, 1991

[54] EXPOSURE CONTROL APPARATUS FOR VARIABLE MAGNIFICATION COPYING MACHINE

[75] Inventors: Hideshi Oushiden, Kawasaki; Norio Imada, Tokyo, both of Japan

[73] Assignee: Kabushiki Kaisha Toshiba, Kawasaki, Japan

[21] Appl. No.: 387,996

[22] Filed: Aug. 1, 1989

[30] Foreign Application Priority Data

Aug. 5, 1988 [JP] Japan .............................. 63-195451

[51] Int. Cl.[5] ...................... G03G 15/04; G03B 27/72

[52] U.S. Cl. .................................. 355/218; 355/228; 355/243; 355/69

[58] Field of Search ............... 355/208, 214, 228, 229, 355/68, 69, 243, 55-57

[56] References Cited

U.S. PATENT DOCUMENTS 4,573,787 3/1986 Sanbayashi et al. ................ 355/214

FOREIGN PATENT DOCUMENTS 2926360 1/1980 Fed. Rep. of Germany .

3425572 1/1985 Fed. Rep. of Germany .

3517964 1/1986 Fed. Rep. of Germany .

3921640 1/1990 Fed. Rep. of Germany .

60-17438 1/1985 Japan .

*Primary Examiner*—Joan H. Pendegrass

*Attorney, Agent, or Firm*—Cushman, Darby & Cushman

[57] ABSTRACT

An exposure amount for a document is adjusted by using three modes, i.e., a one-to-one magnification adjustment mode for adjusting an exposure amount for a document at a one-to-one magnification, an enlargement adjustment mode for adjusting an exposure amount for a document at a maximum magnification, and a reduction adjustment mode for adjusting an exposure amount for a document at a minimum magnification, and to control an exposure amount corresponding to a desired copy magnhification in accordance with the adjusted exposure amount. A fine adjustment mode is set through a ten-key pad of an operation panel. In this fine adjustment mode, a desired copy magnification is set between the one-to-one magnification and the maximum magnification by a magnification setting key. When an exposure amount at the set copy magnification is input through the ten-key pad, the input exposure amount is stored in a nonvolatile memory in accordance with the set copy magnification. If a copy operation is performed upon switching from the fine adjustment mode to a normal copy mode, data corresponding to the exposure amount stored in the nonvolatile memory is supplied to a lamp regulator. The exposure amount of an exposure lamp is then controlled by the lamp regulator.

13 Claims, 16 Drawing Sheets

EXPOSURE CONTROL APPARATUS FOR VARIABLE MAGNIFICATION COPYING MACHINE

BACKGROUND OF THE INVENTION

1. Field of the Invention

The present invention relates to a copying machine capable of changing a copy magnification and, more particularly, to an exposure control apparatus for controlling an amount of light to be radiated from an exposure lamp onto a document in accordance with a copy magnification.

2. Description of the Related Art

Japanese Patent Disclosure (Kokai) No. 60-17438 discloses an exposure control apparatus for controlling an amount of light to be radiated from an exposure lamp onto a document in a copying machine.

This exposure control apparatus includes a reference voltage generating circuit for controlling an exposure amount. This circuit has a digital attenuator. The exposure control apparatus obtains an optimal exposure amount corresponding to a given copy magnification by adjusting the digital attenuator on the basis of data corresponding to the copy magnification.

A conventional copying machine is designed to change copy magnifications from reduction (magnification: 71%) to enlargement (magnification: 141%) in a stepless manner. For this reason, when exposure amounts of an exposure control apparatus are to be set, exposure amounts are adjusted at, e.g., three magnification points; one-to-one magnification (magnification: 100%), reduction (magnification: 71%), and enlargement (magnification 141%), and a curve is obtained by connecting points representing the exposure amounts set at these three points. Since this curve represents exposure amounts corresponding to the copy magnification at the three points and other copy magnifications, an exposure amount corresponding to a predetermined copy magnification can be obtained from this curve.

When a document is actually copied, an exposure amount corresponding to a given copy magnification is obtained from the above-described curve, and a digital attenuator of the exposure control apparatus is adjusted in accordance with the obtained exposure amount. Therefore, even if magnifications are changed from enlargement to reduction in a stepless manner, optimal exposure amounts can be set.

A copying machine capable of setting copy magnifications from 65% to 200% has recently been developed. Similar to the above-described copying machine, in this copying machine, exposure amounts are adjusted on the basis of only the three points, i.e., one-to-one magnification, enlargement, and reduction. In this copying machine, however, since the range of copy magnifications from one-to-one magnification to enlargement is wide, optimal exposure amounts cannot be obtained near a magnification of 140%.

SUMMARY OF THE INVENTION

It is an object of the present invention to provide an exposure amount control apparatus capable of always obtaining an optimal exposure amount at each copy magnification even in a copying machine having a wide range of copy magnifications.

In order to achieve the object of the present invention, there is provided an exposure control apparatus of a copying machine, comprising:

means for adjusting exposure amounts of a document at first, second, third and fourth exposure amount adjustment points set in order within a predetermined copy magnification range from a minimum reduction copy magnification to a maximum enlargement copy magnification; and means for calculating an exposure amount at an arbitrary copy magnification point between the first and second exposure amount adjustment points, between the second and third exposure amount adjusting points, and between the third and fourth exposure amount adjusting points, by using the exposure amounts adjusted at the first and second exposure amount adjustment points, the second and third exposure amount adjustment points, and the third and fourth exposure amount adjustment points, respectively.

According to the present invention, an exposure amount is adjusted on the basis of three points, i.e., one-to-one magnification, maximum magnification, and minimum magnification, and the exposure amount is finely adjusted between the one-to-one magnification and the maximum magnification. By using the exposure amount adjusted on the basis of the one-to-one magnification, the maximum magnification, and the minimum magnification, and between the one-to-one magnification and the maximum magnification, an optimal exposure amount can be set at an arbitrary copy magnification from the minimum to maximum magnifications.

BRIEF DESCRIPTION OF THE DRAWINGS

FIGS. 7 and 8 are flow charts for explaining exposure adjustment, in which FIG. 7 is a flow chart showing an adjustment procedure of 141% manual exposure and FIG. 8 is a flow chart showing an adjustment procedure of 141% automatic exposure;

DETAILED DESCRIPTION OF THE PREFERRED EMBODIMENT

An embodiment of the present invention will be described below with reference to the accompanying drawings.

Figure 11:
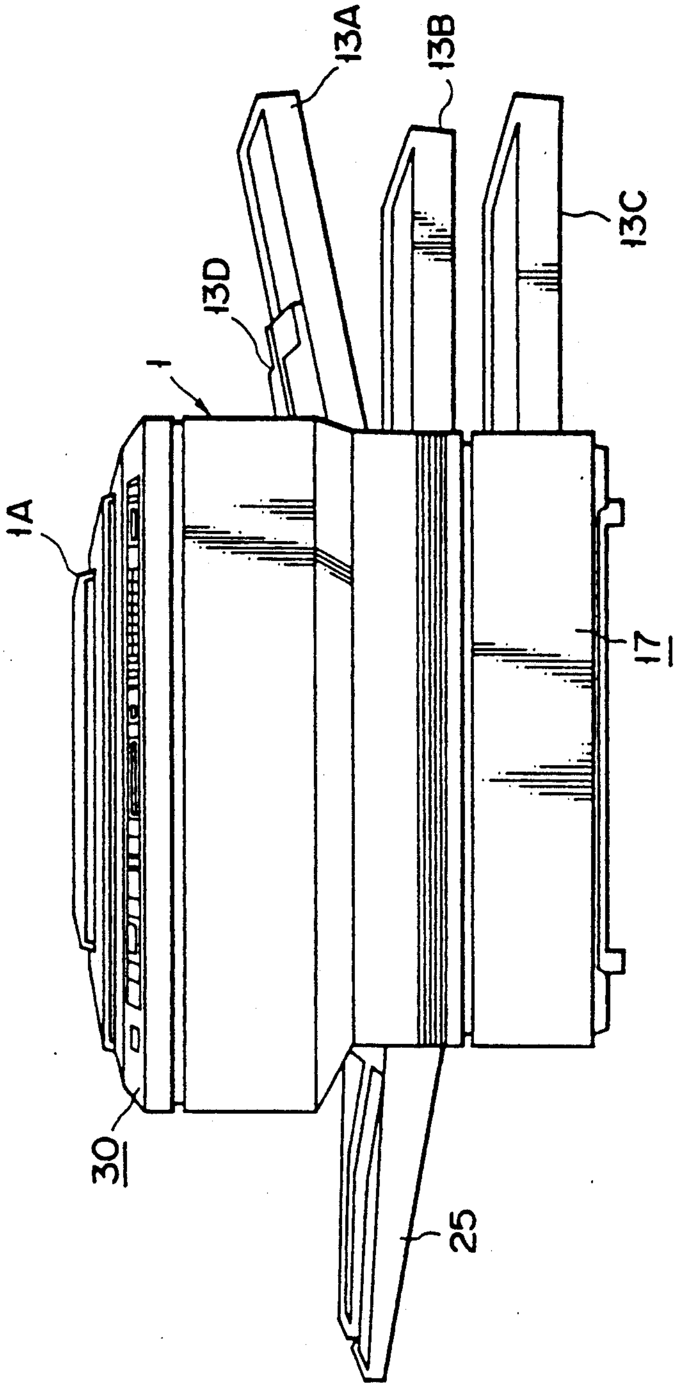
FIG. 11 is a view showing an outer appearance of a copying machine to which the present invention is applied.
Figure 12:
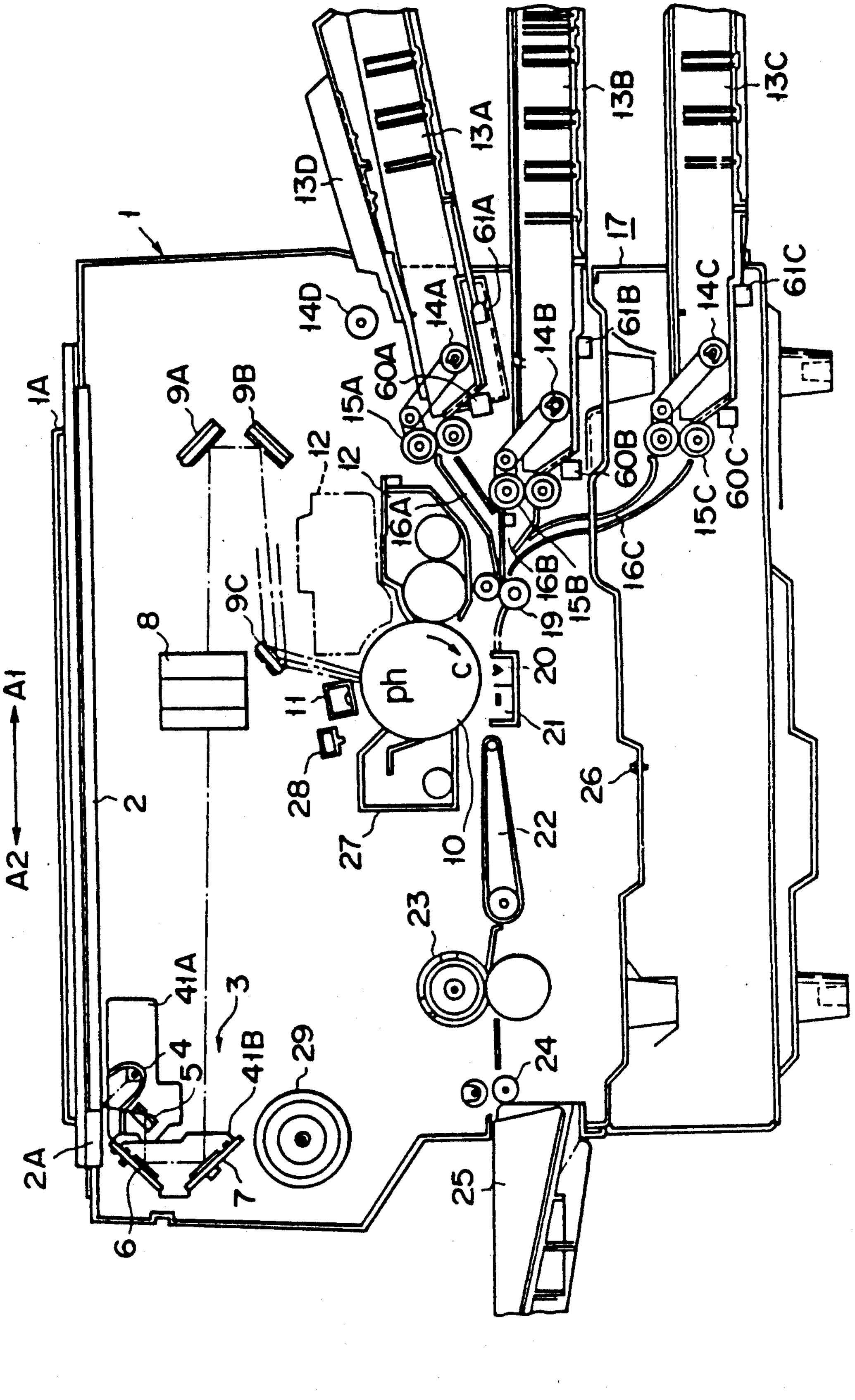
FIG. 12 is a side sectional view showing the copying machine in FIG. 11.

FIGS. 11 and 12 schematically show a copying machine to which an exposure control apparatus of the present invention is applied.

A document table 2 on which a document is set is fixed on the upper surface of a copying machine main body 1. The document table 2 is covered with a document cover 1A which is pivotally arranged on the main body 1. A stationary scale 2A serving as a reference for setting a document is formed on one end portion of the document table 2.

An optical system 3 including an exposure lamp 4 and mirrors 5, 6, and 7 is arranged on the lower surface of the document table 2. The optical system 3 can be reciprocated along the document table 2 in directions indicated by arrows A1 and A2. When the optical system 3 is moved along the document table 2, a document set on the document table 2 is exposed and scanned. The mirrors 6 and 7 are moved at a speed ½ that of the mirror 5 so as to keep an optical path constant.

Light radiated from the exposure lamp 4 onto the document when the document is exposed and scanned by the optical system 3 is reflected by the document. The light reflected by the document is reflected by the mirrors 5, 6, and 7 and is then guided to a photosensitive drum 10 through a variable magnification lens block 8 and mirrors 9A, 9B, and 9C. As a result, an image corresponding to the image of the document is formed on the surface of the photosensitive drum 10.

The photosensitive drum 10 is rotated in a direction indicated by an arrow c in FIG. 12. The surface of the drum 10 is charged by a charger 11. When the image of the document is exposed by an exposure section Ph after this operation, an electrostatic latent image is formed on the surface of the drum 10. When a toner is applied to the electrostatic latent image by a developing unit 12, the image becomes a visual or toner image.

Paper feed cassettes 13A and 13B in which sheets of paper are stored are detachably arranged in the main body 1. A paper feed cassette 13C is detachably arranged in a paper feed unit 17 mounted on the main body 1. A manual insertion section 13D for manually inserting a sheet in the main body 1 is arranged above the paper feed cassette 13A.

Pickup rollers 14A, 14B, and 14C and roller pairs 15A, 15B, and 15C are arranged in the main body 1 and the paper feed unit 17 in accordance with the paper feed cassettes 13A, 13B, and 13C. The pickup rollers 14A, 14B, and 14C and the roller pairs 15A, 15B, and 15C are selectively operated in accordance with designation through an operation panel 30 (to be described later). Sheets which are extracted one by one from the paper feed cassettes 13A, 13B, and 13C by the pickup rollers 14A, 14B, and 14C and the roller pairs 15A, 15B, and 15C or from the manual insertion section 13D are guided to a registration roller pair 19 through paper guide paths 16A, 16B, and 16C, and are conveyed to a transfer section by the registration roller pair 19.

Each sheet conveyed to the transfer section is brought into tight contact with the surface of the photosensitive drum 10 by a transfer charger 20, and the toner image formed on the drum 10 is transferred onto the sheet by the effect of the charger 20. The sheet on which the image is transferred is separated from the drum 10 by a separation charger 21, and is conveyed to a fixing roller pair 23 as a fixing unit through a convey belt 22. When the sheet passes through the fixing roller pair 23, the toner image is fixed on the sheet. The sheet on which the image is fixed is then discharged to a tray 25 outside the main body 1 by a discharge roller pair 24.

After the toner image is transferred onto the sheet, a residual toner is removed from the drum 10 by a cleaner 27, and an afterimage is erased by a discharge lamp 28. As a result, the drum 10 is restored to its initial state. A cooling fan 29 is used to prevent the temperature of the main body 1 from rising.

The mirror 5 and the exposure lamp 4 are arranged on a first carriage 41A, and the mirrors 6 and 7 are arranged on a second carriage 41B.

Cassette size detecting switches 60A, 60B, and 60C comprised by, e.g., microswitches are arranged near the paper feed cassettes 13A, 13B, and 13C. The sizes of sheets stored in the cassettes 13A, 13B, and 13C are respectively detected by these detecting switches 60A, 60B, and 60C.

Detectors 61A, 61B, and 61C are arranged in the main body 1 and the paper feed unit 17 in correspondence with the paper feed cassettes 13A, 13B, and 13C. These detectors 61A, 61B, and 61C are photosensors comprised by, e.g., light-emitting diodes and photodiodes. The detectors 61A, 61B, and 61C are arranged to oppose openings (not shown) formed in bottom portions of the cassettes 13A, 13B, and 13C, respectively, so as to detect the presence/absence of sheets stored in the cassettes 13A, 13B, and 13C.

Figure 13:
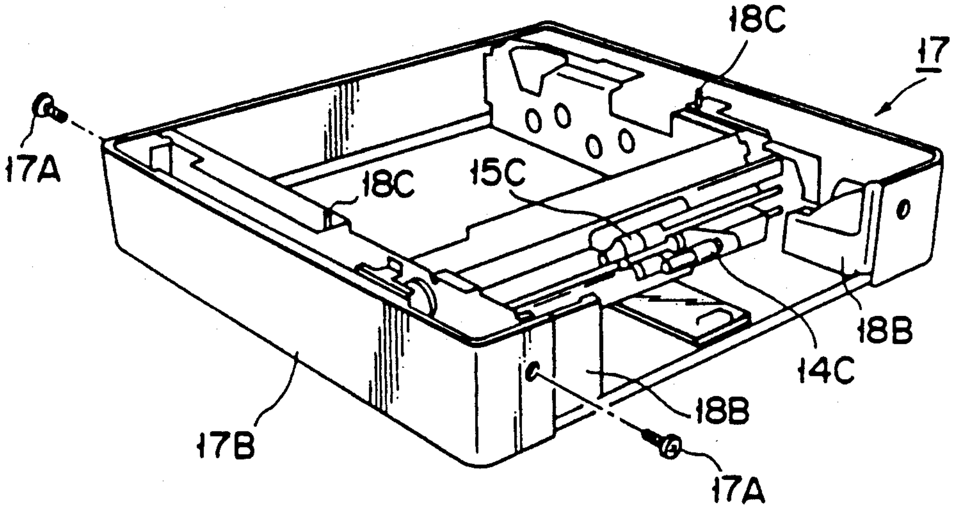
FIG. 13 is a perspective view showing an arrangement of a paper feed unit in FIGS. 11 and 12.
Figure 14:
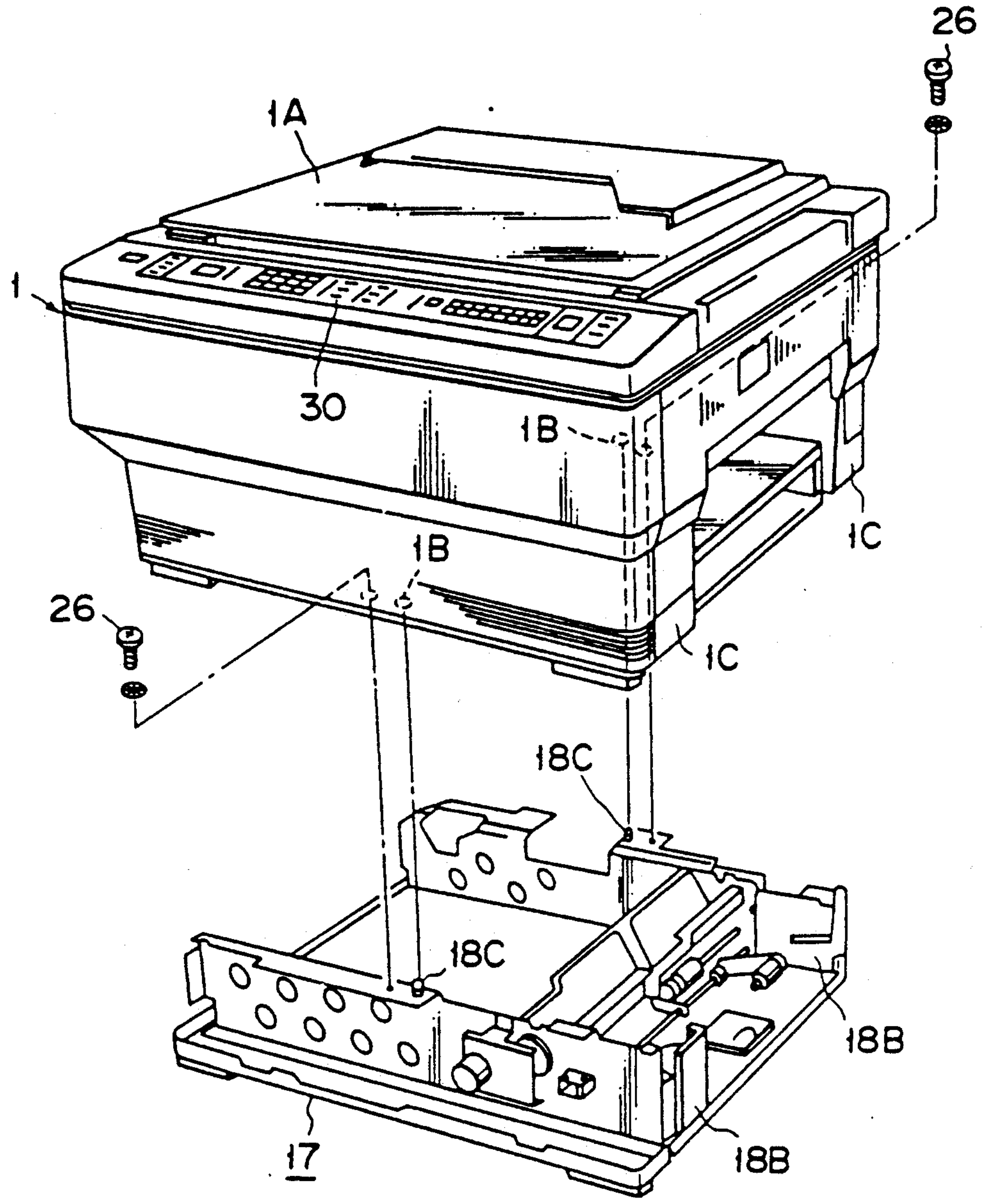
FIG. 14 is an exploded perspective view for explaining an operation of mounting the paper feed unit on the copying machine.

FIGS. 13 and 14 show an arrangement of the paper feed unit 17. A cover 17B is fixed on the paper feed unit 17 by screws 17A. When the unit 17 is to be mounted on the main body 1, engaging holes 1B and cassettes guides 1C on the main body 1 side are respectively matched with engaging projections 18C and cassette guides 18B on the paper feed unit 17 side, and the unit 17 and the main body 1 are fixed to each other by screws 26 in this state.

Figure 15:
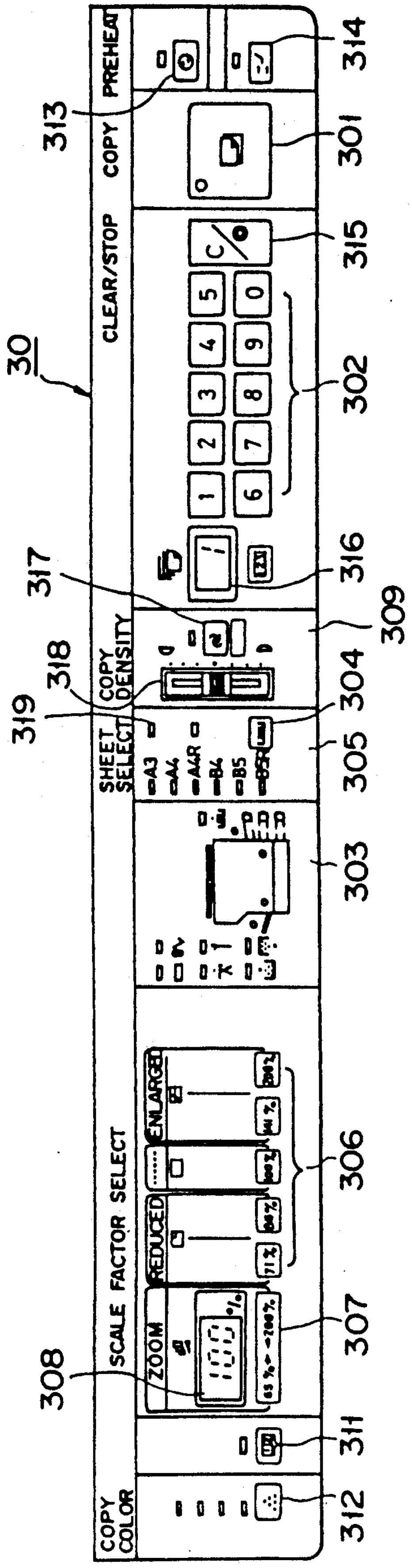
FIG. 15 is a plan view showing an arrangement of an operation panel.

FIG. 15 shows the operation panel 30 formed on the main body 1. A copy key 301 is used to provide a command to start a copying operation. A ten key pad 302 sets a number of copies, and the like, in the machine. A display portion 303 displays an operating state of each component of the main body, a sheet jam, and the like. A cassette selecting key 304 is used to select one of the cassettes 13A, 13B, and 13C. A cassette display portion 305 displays the sheet size of a selected cassette. A magnification setting key 306 is used to select a predetermined copy magnification. A zoom key 307 is used to set an arbitrary copy magnification, and is designed to set copy magnifications from 65% to 200% in units of 1%. A magnification display portion 308 displays a copy magnification set by the zoom key 307. A density setting section 309 is used to set a copy density.

A page continuous copy key 311 is used to set a page continuous copy function for copying pages of a book one by one while the book is opened. A color designation key 312 is used to select a toner color in color copying. A preheat key 313 is used to set the fixing roller pair 23 in a preheat state by decreasing its temperature or to release this preheat state. An interruption key 314 is operated to perform another copying operation in the course of a continuous copying operation. Upon one operation, a clear key 315 functions as a clear/stop key for designating correction of a set number of copies or stop of a copying operation. Upon two operations, the clear key 315 functions as an all clear key for canceling a set number of copies or set copy conditions such as a copy magnification. An entry number display portion 316 displays the number of copies or the like entered through a ten-key pad 302. An automatic exposure key 317 is used to automatically set a copy density. Upon operation of the automatic exposure key 317, automatic and manual exposure operations can be switched from each other. An exposure setting volume 318 is used to manually set a copy density. A manual insertion display 319 displays a manual insertion copy mode and is illuminated when a sheet is set in the manual insertion guide 13D.

Figure 16:
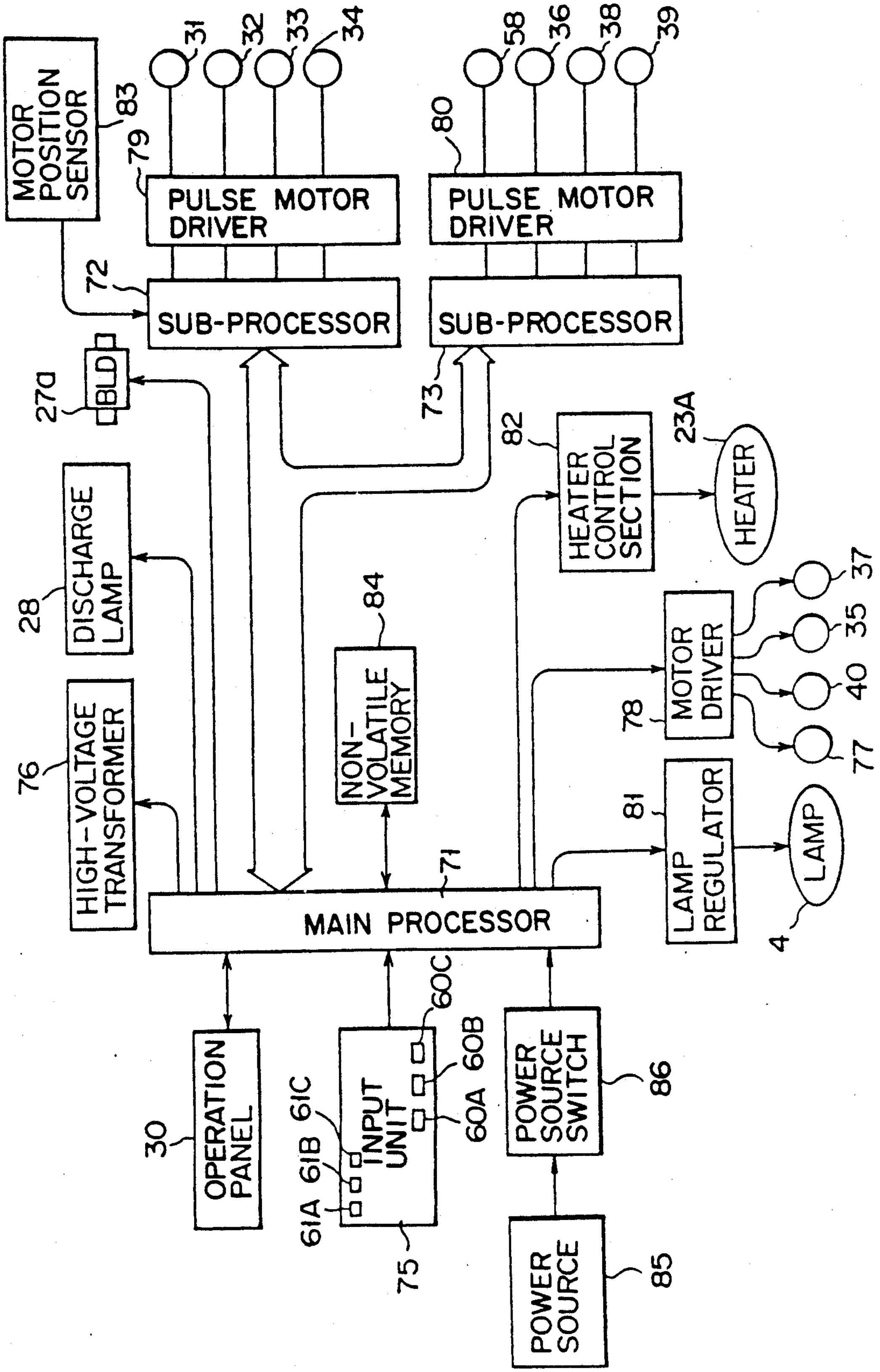
FIG. 16 is a schematic block diagram showing a main part of a control circuit.

FIG. 16 shows a main part of a control circuit.

A main processor 71 is comprised by, e.g., a microcomputer. The main processor 71 is connected to the operation panel 30, an input unit 75 including the cassette size detecting switches 61A, 61B, and 61C, the detectors 61A, 61B, and 61C, and the like, a high-voltage transformer 76 for driving the respective chargers, the discharge lamp 28, a blade solenoid 27A of the cleaner 27, subprocessors 72 and 73 for controlling various pulse motors, a lamp regulator 81 for controlling the exposure lamp 4, a heater control section 82 for controlling a heater 23A of the fixing roller pair 23, a motor driver 78 for controlling motors 35, 37, 40, and 77, a nonvolatile memory 84 for storing exposure data and the like, and a power source switch 86 for turning on and off a power source 85.

The main processor 71 performs the above-described copying operations by controlling the high-voltage transformer 76 for driving the chargers, the lamp regulator 81 for turning on the exposure lamp 4, and the like in response to signals supplied from the operation panel 30 and the input unit 75.

Pulse motor drivers 79 and 80 are respectively connected to the subprocessors 72 and 73. Pulse motors 31 to 34 are connected to the driver 79, whereas pulse motors 58, 36, 38, and 39 are connected to the driver 80.

When enlargement/reduction copying is to be performed, the motor 31 is used to move the lens block 8 in accordance with a set copy magnification, and the motor 32 is used to change the distance between the mirror 5 and the mirrors 6 and 7. The motor 33 moves the first carriage 41A. In addition, the motor 34 is used to move a shutter (not shown) for adjusting a width of the photosensitive drum 10 to be charged by the charger 11 in accordance with a copy magnification when enlargement/reduction copying is performed. The motor 35 drives developing rollers of the developing unit 12 and the like. The motor 36 drives the drum 10. The motor 37 drives the convey belt 22, the fixing roller pair 23, and the discharge roller pair 24. The motor 38 drives the pickup rollers 14A to 14D and the roller pairs 15A to 15C. The motor 39 drives the registration roller pair 19. The motor 40 drives the cooling fan 29.

The main processor 71 supplies drive/stop instructions of the respective motors to the subprocessors 72 and 73. The subprocessors 72 and 73 supply status signals representing drive/stop states of the motors to the main processor 71. In addition, the subprocessor 72 receives position data from a position sensor 83 for detecting the initial positions of the motors 31 to 34. The subprocessors 72 and 73 are comprised by, e.g., microcomputers, programmable interval timers for counting reference clock pulses to control switching of the phases of the respective motors in accordance with set values supplied from the microcomputers, and the like. The count results of the reference clock pulses are supplied from the subprocessors 72 and 73 to the main processor 71.

The nonvolatile memory 84 is comprised by, e.g., an E2PROM, in which exposure amounts for automatic exposure are stored in accordance with predetermined copy magnifications, and exposure amounts for manual exposure are stored in accordance with predetermined copy magnifications.

In addition, data for adjusting an exposure amount at, e g., a copy magnification of 141% is stored in the memory 84. This data can be updated by a serviceman while the main processor 71 is set in an adjust (AJ) mode.

Figure 1:
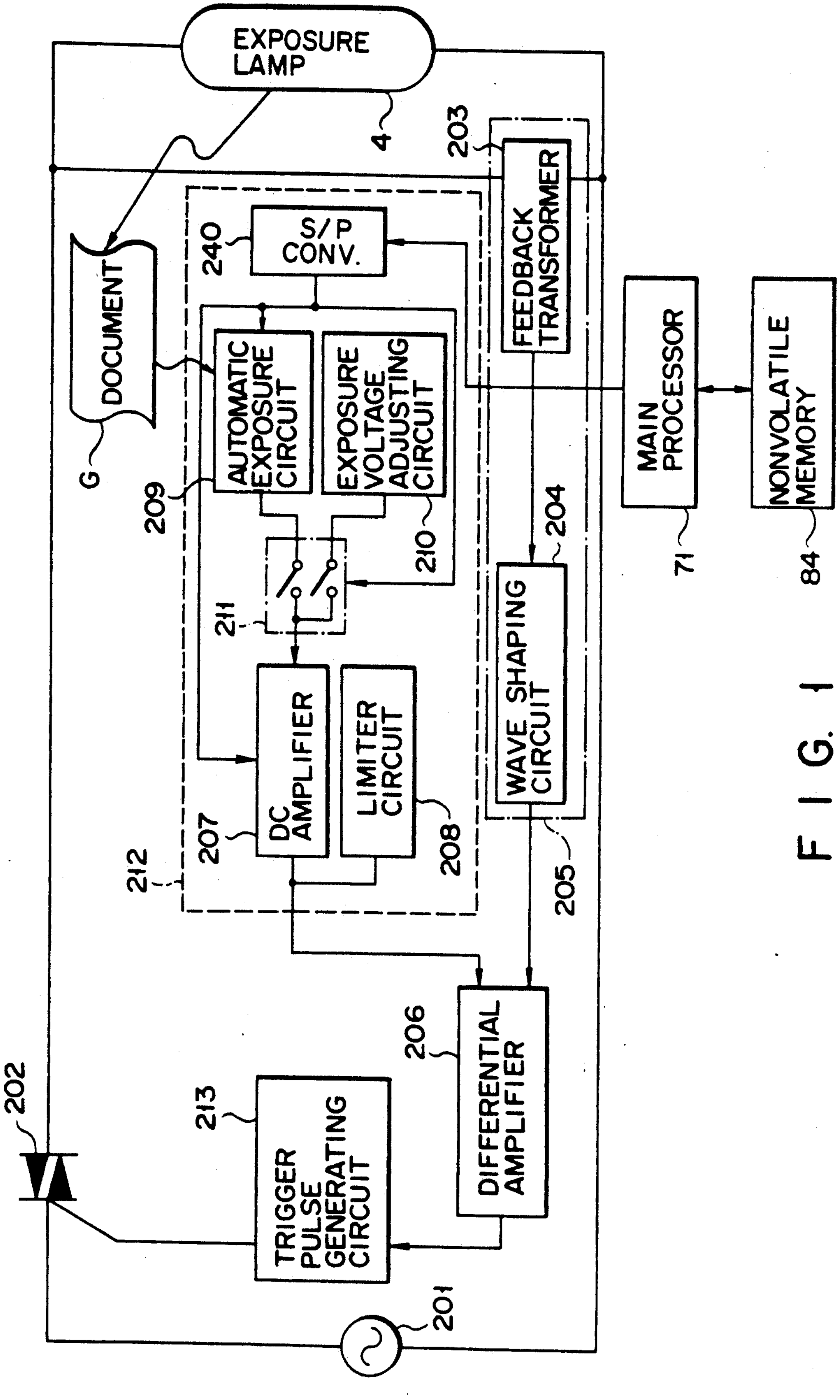
FIG. 1 is a schematic block diagram showing an arrangement of an exposure control apparatus.

FIG. 1 shows the lamp regulator 81.

The exposure lamp 4 is connected to an AC power source 210 through a bidirectional triode thyrister (TRIAC) 202. A feedback transformer 203 is connected in parallel with the exposure lamp 4. The feedback transformer 203 outputs a voltage corresponding to the voltage across the exposure lamp 4 when the TRIAC 202 is turned on. The feedback transformer 203 is connected to a wave shaping circuit 204. The circuit 204 outputs a voltage corresponding to the effective voltage of the exposure lamp 4 by wave-shaping an output voltage from the feedback transformer 203. The wave shaping circuit 204 and the feedback transformer 203 constitute a voltage generating circuit 205 for generating a voltage corresponding to a voltage to be applied to the exposure lamp 4.

The wave shaping circuit 204 is connected to one input terminal of a differential amplifier 206. A reference voltage generating circuit 212 which is controlled by the main processor 71 is connected to the other input terminal of the differential amplifier 206.

The reference voltage generating circuit 212 includes a serial/parallel converter 240 for converting a serial control signal supplied from the main processor 71 into a parallel control signal, an automatic exposure circuit 209 for controlling an exposure amount corresponding to an amount of light emitted from the exposure lamp 4 and reflected by a document G in accordance with an output signal from the serial/parallel converter 240, an exposure voltage adjusting circuit 210 for manually controlling an exposure voltage, a switch 211 for switching between the automatic exposure circuit 209 and the exposure voltage adjusting circuit 210 in accordance with an output from the serial/parallel converter 240, a DC amplifier 207, connected to the switch 211, for amplifying a voltage supplied through the switch 211 in accordance with an output signal from the serial/parallel converter 240, and a limiter circuit 208 connected to the output terminal of the DC amplifier 207. The output terminal of the DC amplifier 207 is connected to the other input terminal of the differential amplifier 206.

The differential amplifier 206 generates a voltage corresponding to the difference between an exposure reference voltage supplied from the reference voltage generating circuit 212 and a voltage supplied from the voltage generating circuit 205.

The output terminal of the differential amplifier 206 is connected to the gate of the TRIAC 202 through a trigger pulse generating circuit 213. The trigger pulse generating circuit 213 generates a trigger pulse synchronized with the power source in accordance with a voltage supplied from the differential amplifier 206. The generated trigger pulse is supplied to the gate of the TRIAC 202. As a result, the ON timing of the TRIAC 202 is controlled by the trigger pulse supplied from the trigger pulse generating circuit 213, thus controlling the exposure amount of the exposure lamp 4.

Figure 2:
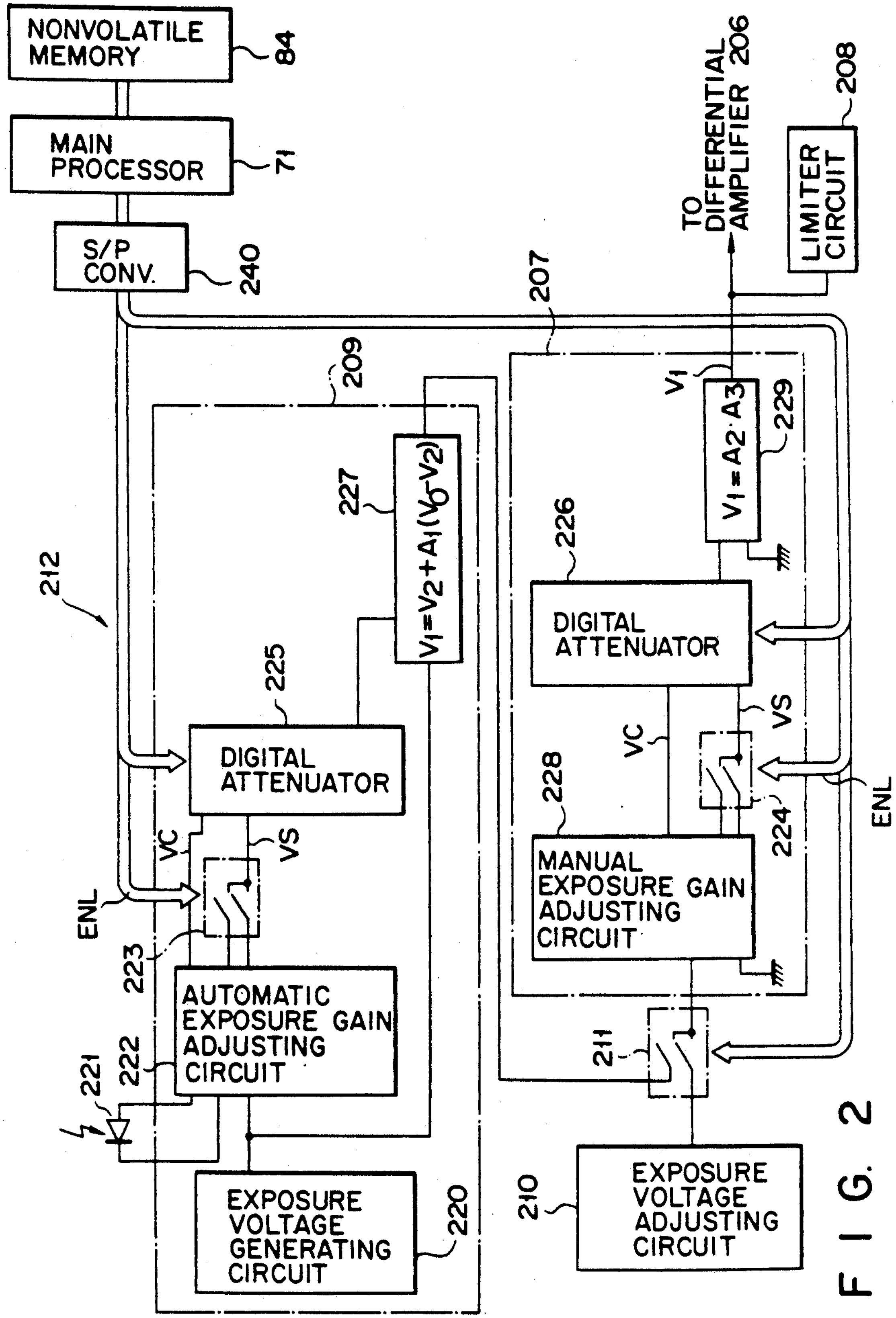
FIG. 2 is a schematic block diagram showing an arrangement of a reference voltage generating circuit in FIG. 1.
Figure 3:
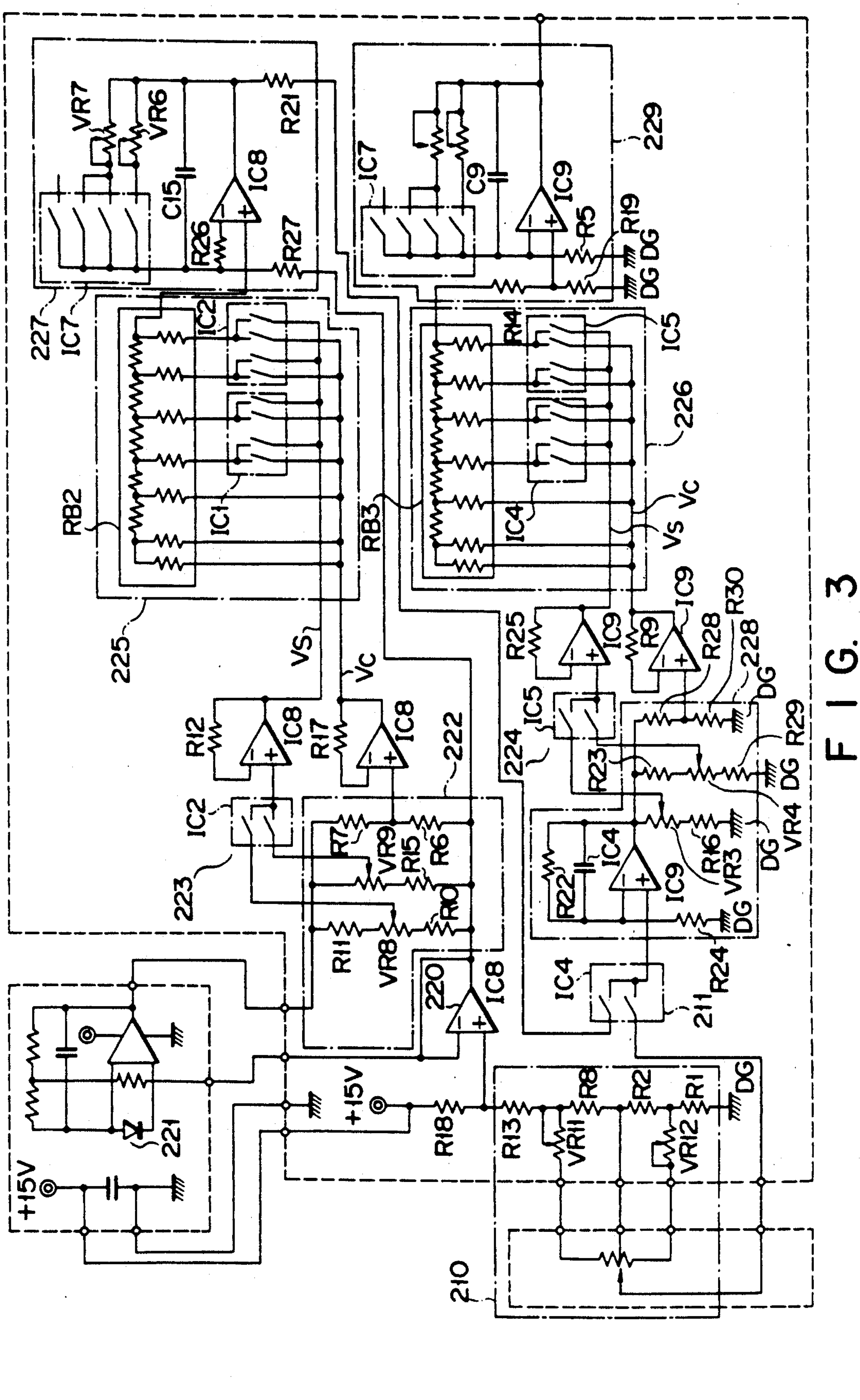
FIG. 3 is a circuit diagram showing an arrangement of the reference voltage generating circuit.

FIG. 2 shows the reference voltage generating circuit 212. FIG. 3 shows a circuit diagram of FIG. 2. The same reference numerals in FIGS. 2 and 3 denote the same parts.

The automatic exposure circuit 209 comprises an exposure voltage generating circuit 220, an automatic exposure gain adjusting circuit 222, an enlargement/reduction switch 223, a digital attenuator 225, and an arithmetic circuit 227.

The exposure voltage generating circuit 220 generates an exposure reference voltage. A photoelectric converter 221 comprised by, e.g., a photodiode receives light reflected from the document G and generates a current corresponding to the reflected light. The exposure voltage generating circuit 220 and the photoelectric converter 221 are connected to the automatic exposure gain adjusting circuit 222. The circuit 222 sets gains respectively corresponding to one-to-one, enlargement, and reduction magnifications in proportion to output currents from the photoelectric converter 221 with respect to reference voltages supplied from the exposure voltage generating circuit 220.

More specifically, gains for enlargement and reduction magnifications are respectively set by potentiometers VR8 and VR9 shown in FIG. 3. A gain for a one-to-one magnification is set by a divided-voltage ratio between resistors R6 and R7.

An enlargement/reduction switch 223 constituted by, e.g., an analog switch is connected to the potentiometers VR8 and VR9 of the automatic exposure gain adjusting circuit 222. The switch 223 is switched by a switch control signal (ENL) supplied from the main processor 71 when enlargement or reduction copying is performed, thereby switching voltages output from the potentiometers VR8 and VR9.

Voltage Vs output from the enlargement/reduction switch 223 and voltage Vc set by a divided-voltage ratio between the resistors R6 and R7 for one-to-one magnification are applied to the digital attenuator 225. The attenuator 225 adjusts the voltages Vs and Vc applied from the automatic exposure gain adjusting circuit 222 in accordance with a control signal (B0 to B3) corresponding to a copy magnification supplied from the main processor 71.

The digital attenuator 225 and the exposure voltage generating circuit 220 are connected to the arithmetic circuit 227. The arithmetic circuit 227 performs a predetermined arithmetic operation for an output voltage from the digital attenuator 225 and a reference voltage supplied from the exposure voltage generating circuit 220.

The exposure voltage adjusting circuit 210 is a circuit for manually adjusting an exposure voltage. The exposure voltage adjusting circuit 210 and the arithmetic circuit 227 are connected to an automatic/manual operation switch 211 comprised by, e.g., an analog switch. The switch 211 is switched by a control signal (B0 to B3) supplied from the main processor 71. The switch 211 is connected to a manual exposure gain adjusting circuit 228 included in the DC amplifier 207.

The DC amplifier 207 comprises the manual exposure gain adjusting circuit 228, an enlargement/reduction switch 224, a digital attenuator 226, and an amplifier 229.

The manual exposure gain adjusting circuit 228 amplifies voltages supplied from the arithmetic circuit 227 or the exposure voltage adjusting circuit 210 in accordance with one-to-one, enlargement, and reduction magnifications.

More specifically, gains for enlargement and reduction magnifications are respectively set by potentiometers VR3 and VR4 shown in FIG. 3. A gain for a one-to-one magnification is set by a divided-voltage ratio between resistors R28 and R30.

The enlargement/reduction switch 224 comprised by, e.g., an analog switch is connected to the potentiometers VR3 and VR4 of the manual exposure gain adjusting circuit 228. The switch 224 is switched by a switch control signal (ENL) supplied from the main processor 71 upon enlargement or reduction copying, thereby switching voltages output from the volumes VR3 and VR4.

Voltage Vs output from the enlargement/reduction switch 224 and voltage Vc for a one-to-one magnification set by a divided-voltage ratio between the resistors R28 and R30 are applied to the digital attenuator 226. The attenuator 226 adjusts the voltages Vs and Vc applied from the manual exposure gain adjusting circuit 228 in accordance with a control signal (B0 to B3) corresponding to a copy magnification supplied from the main processor 71.

The digital attenuator 226 is connected to the amplifier 229. The amplifier 229 amplifies a voltage applied from the attenuator 226 and applies it to the differential amplifier 206.

Figure 4:
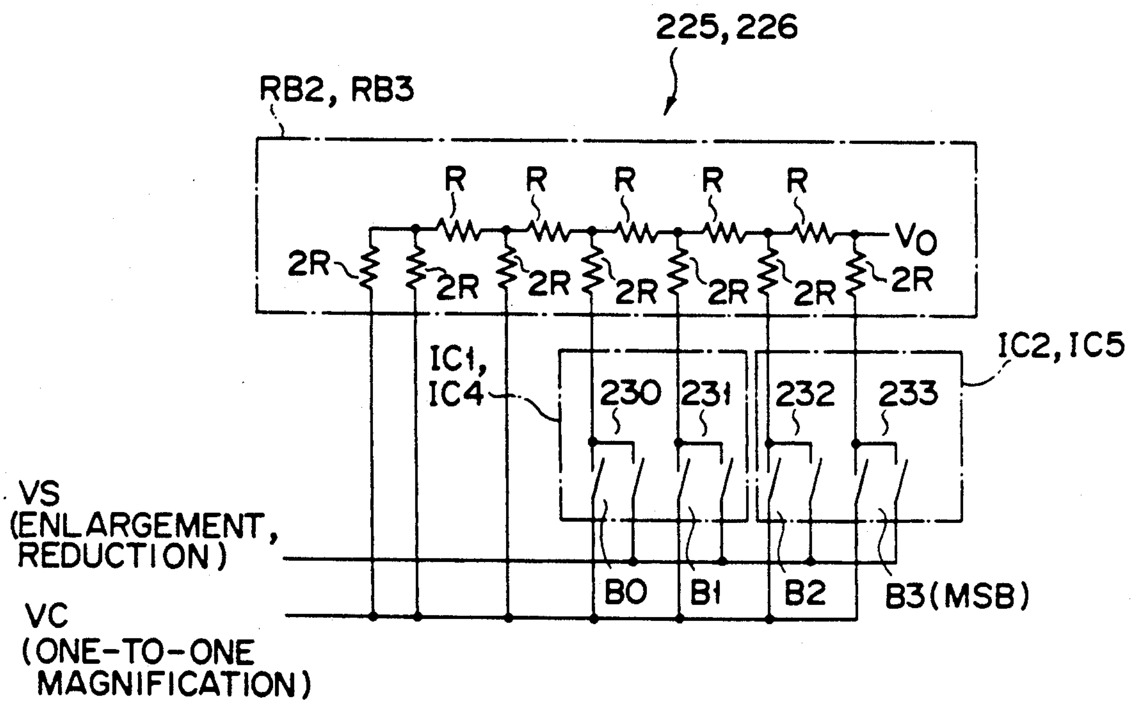
FIG. 4 is a circuit diagram showing an arrangement of a digital attenuator.

FIG. 4 shows the digital attenuator 225 or 226. These attenuators 225 and 226 are respectively comprised by four-bit ladder resistor type digital attenuators. The attenuators 225 and 226 respectively comprise ladder resistor networks RB2 and RB3 each of which is comprised by resistors respectively having resistance values R and 2R, and analog switches IC1, IC2, IC4, and IC5 including switches 230 to 233.

Figure 5:
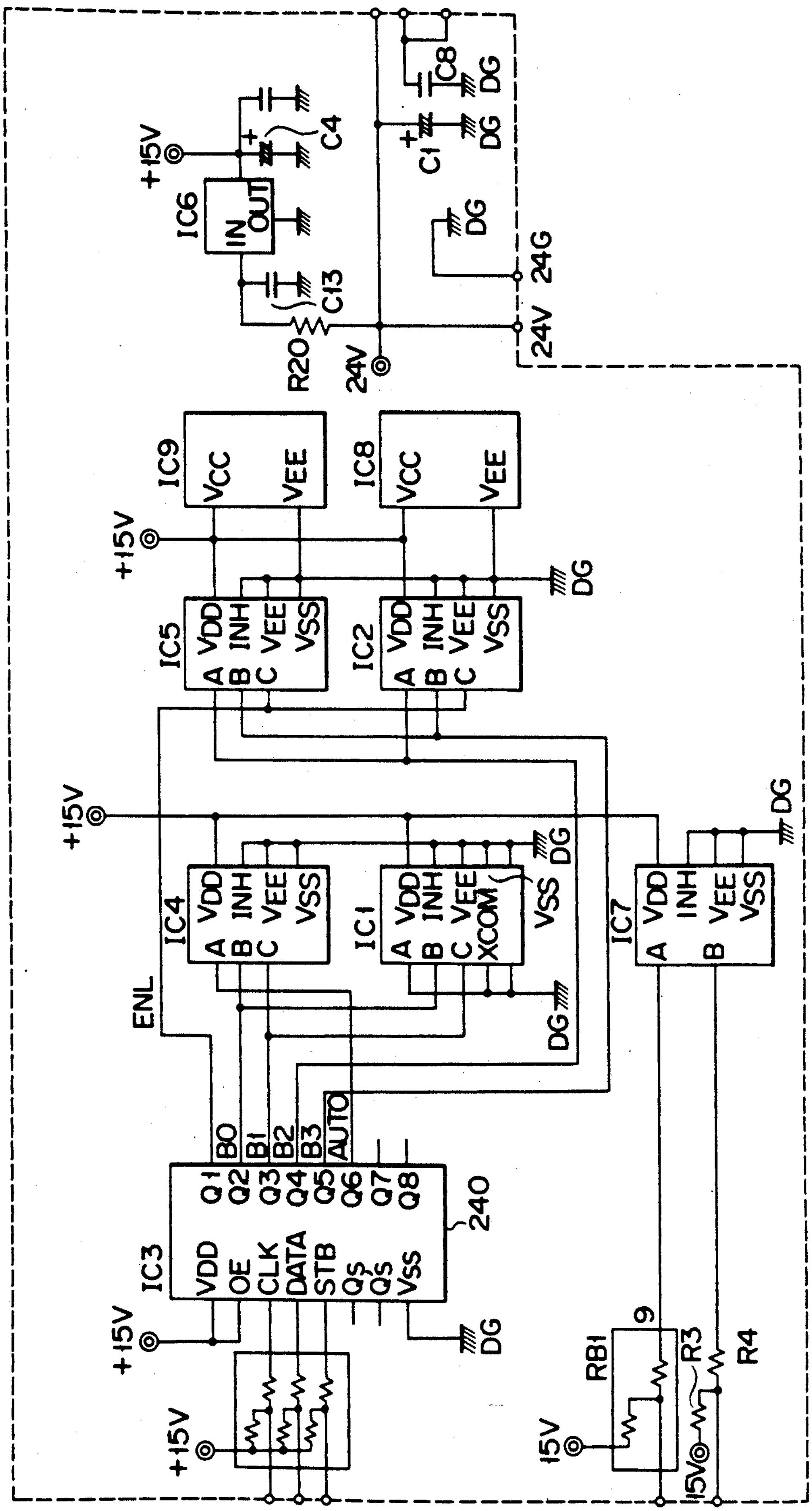
FIG. 5 is a block diagram showing a main part of the circuit in FIG. 3.

As shown in FIG. 5, when control signals B0 to B3 supplied from a serial/parallel converter 240 are set at low level "0", in the respective analog switches IC1, IC2, IC4, and IC5, switches of the switches 230 to 233 to which the voltage Vc (one-to-one magnification: 100%) is applied are turned on, and switches thereof to which the voltage Vs (enlargement, reduction) is applied are turned off. When the control signals B0 to B3 are set at high level "1", the switches on the input common voltage Vc side are turned off, and the switches on the input signal voltage Vs side are turned on. An output voltage Vo from the digital attenuator 225 or 226 is represented by the following equation:

$$
\begin{aligned}
Vo &= (Vs - Vc) \cdot (B0/2^4 + B1/2^3 + B2/2^2 + B3/2) + Vc \\
&= (Vs - Vc) \cdot (B0 \cdot 2^0 + B1 \cdot 2^1 + B2 \cdot 2^2 + B3 \cdot 2^3)/2^4 + Vc
\end{aligned}
$$

In the above equation, since binary numbers represented by the control signals B0 to B3 are decoded into decimal numbers, the numerators take integers "0 to 15". Therefore, by controlling the signals B0 to B3, an arbitrary voltage corresponding to a value obtained by dividing the difference between the input signal voltage Vs and the input common voltage Vc by $2^4$, i.e., 16 can be obtained.

In addition, the output impedance of the circuit having the ladder resistor networks of the resistance values R and 2R is always set to be R regardless of control of the control signals B0 to B3.

Figure 6:
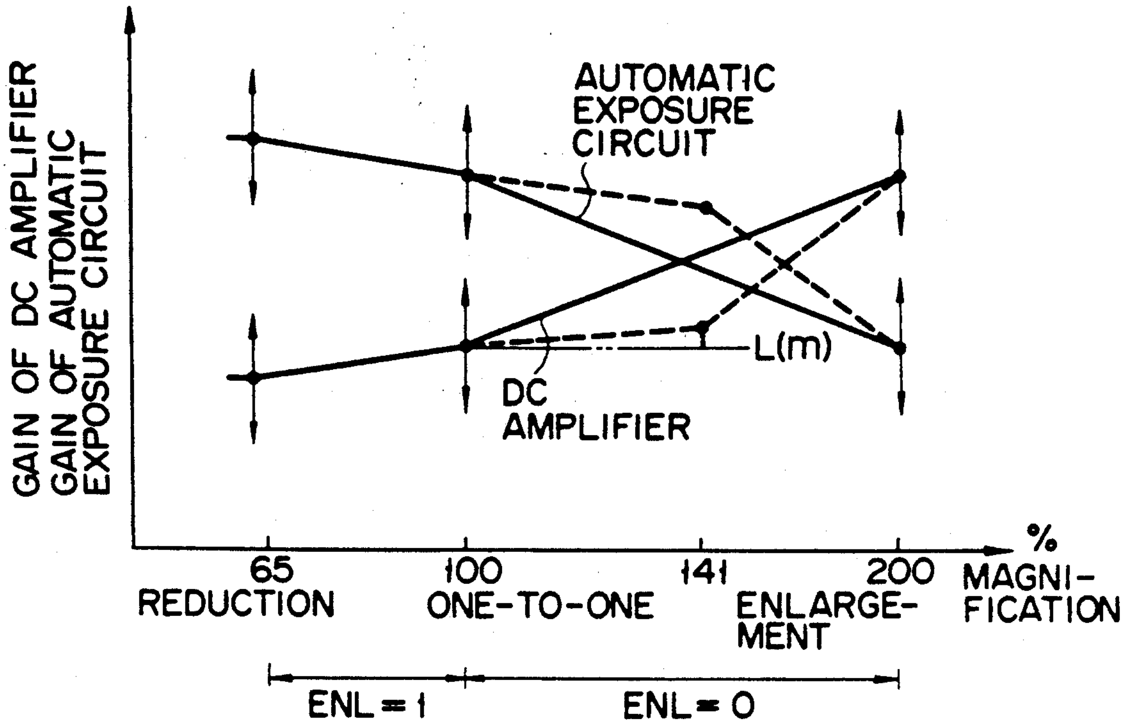
FIG. 6 is a graph for explaining exposure control.

In the apparatus having the above-described arrangement, an exposure amount can be finely adjusted in the wide range of the one-to-one magnification (100%) to the maximum magnification (200%) in accordance with the control signals B0 to B3 output from the main processor 71, as indicated by solid lines in FIG. 6. In addition, in a state wherein the main processor 71 is set in the adjust mode, if an optimal exposure amount is set at an arbitrary intermediate point from the one-to-one magnification to the maximum magnification, e.g., at a magnification of 141%, the exposure control characteristics from the one-to-one magnification to the 141% magnification, and from the 141% magnification to the maximum magnification can be changed, as indicated by broken lines in FIG. 6.

In this case, if a decimal number corresponding to the control signals B0 to B3 is represented by L(m); a magnification at an intermediate point between the one-to-one magnification and the 200% magnification, M ($100\% < M < 200\%$); an adjustment value, s; and a copy magnification, m % ($65\% \leqq m \leqq 200\%$), the relationship between a copy magnification and the control signals is represented by equations (1), (2), and (3), as follows:

If $100\% \leqq m < M$ (the copy magnification m is the one-to-one magnification or is smaller than the magnification M at the intermediate point), $$L(m) = INT\{(m-100)\times s/(M-100)\}\ ENL=0 \quad (1)$$

If $M \leqq m \leqq 200\%$ (the copy magnification is larger than the magnification M at the intermediate point), $$L(m) = INT\{(m-100)\times(15-s)/(200-M)\}+s\ ENL=0 \quad (2)$$

If $65\% \leqq m \leqq 100\%$ (in reduction copying), $$L(m) = 100-m\ ENL=1 \quad (3)$$

If the main processor 71 outputs control signals satisfying the above three equations, an optimal exposure amount can be set at an arbitrary magnification from the one-to-one magnification to the maximum magnification, as indicated by broken lines in FIG. 6.

Fine adjustment in enlargement copying will be described below.

An exposure amount in enlargement copying is adjusted by setting an arbitrary copy magnification between the one-to-one magnification (100%) and the maximum magnification (200%). In this case, a copy magnification of 141% is set.

When an exposure amount at 141% magnification is to be adjusted, exposure amounts for manual and automatic exposure are adjusted at the one-to-one magnification (100%), the maximum magnification (200%), and the minimum magnification (65%) prior to the adjustment for 141% magnification, and these adjustment values are stored in the nonvolatile memory 84. Since this adjustment is disclosed in Japanese Patent Disclosure (Kokai) No 60-17438, a detailed description thereof will be omitted.

Figure 7:
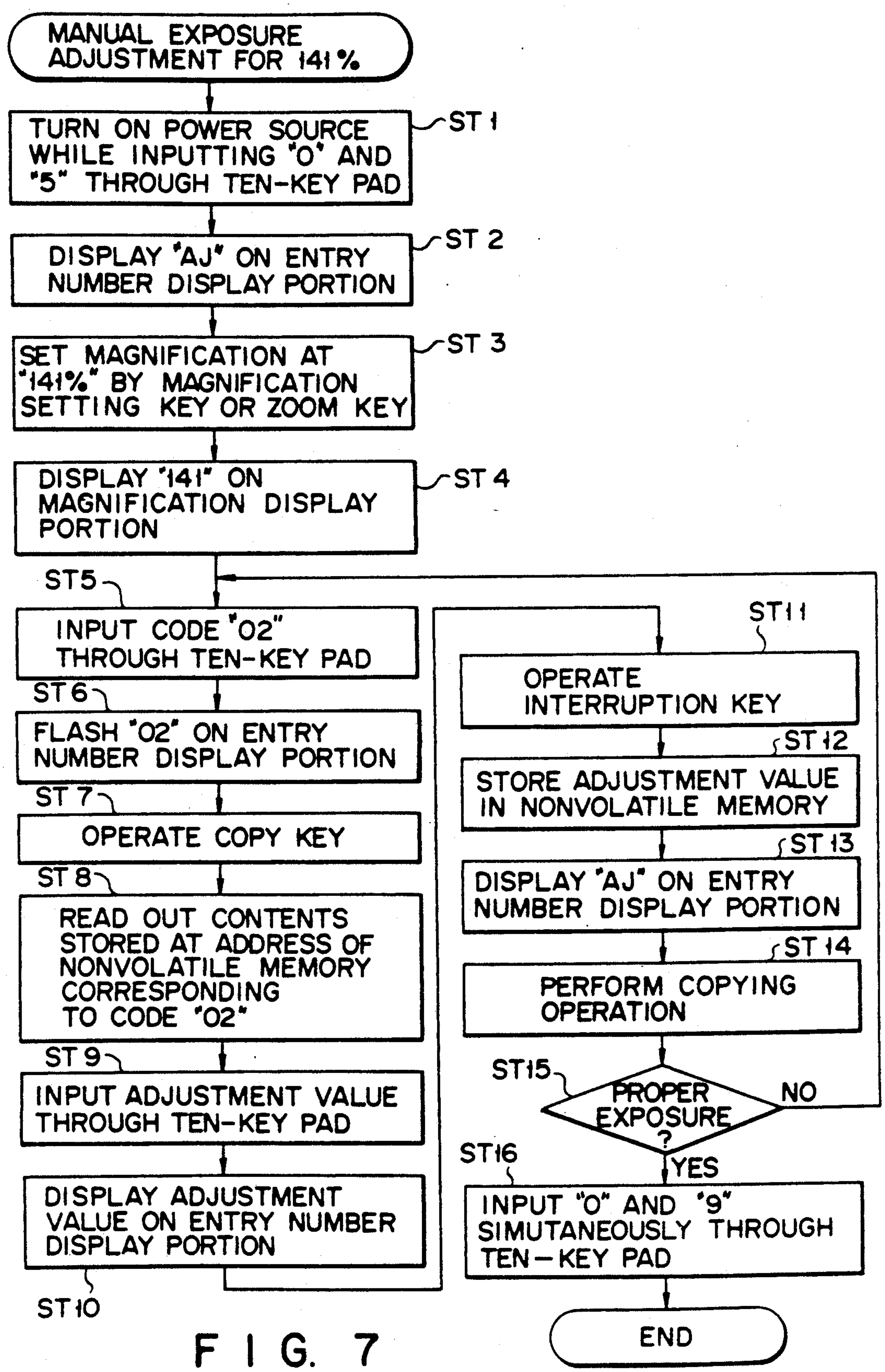

FIG. 7 is a flow chart showing a procedure for performing exposure adjustment of 141% magnification in manual exposure.

Assume that a manual exposure mode is set by the automatic exposure key 317 of the operation panel 30, and an image copied by setting a magnification of 141% using the magnification setting key 306 or the zoom key 307 is not properly exposed. While "0" and "5" are simultaneously input by the ten-key pad 302, the power source 86 arranged in the copying machine main body 1 is turned on (ST1). As a result, the adjust mode for updating the contents of the nonvolatile memory 84 is set, and "AJ" is displayed on the entry number display portion 316 of the operation panel 30 (ST2). When 141% magnification is set by operating the magnification setting key 306 or the zoom key 307, the 141% magnification is displayed on the magnification display 308 (ST3, 4). Thereafter, when a code "02" is input by the ten-key pad 302 (ST5), the code "02" is flashed on the entry number display portion 316 (ST6).

If, for example, the copy key 301 is operated (ST7) in this state, data stored at an address of the memory 84 corresponding to the code "02" is read out and is displayed on the entry number display portion 316 (ST8). In this case, for example, an initial value "6" as data for finely adjusting an exposure amount corresponding to the 141% magnification for manual exposure is stored at the address of the memory 84 corresponding to the code "02". Therefore, if the copy key 301 is operated upon input of the code "02", "6" is displayed on the entry number display portion 316.

In this state, if an adjustment value "3" which is different from the displayed data is input by the ten-key pad 302 (ST9). the adjustment value is displayed on the entry number display portion 316 (ST10). In this case, if the density is increased with respect to the initial value "6", data "0" to "5" is input. If the density is to be decreased, data "7" to "15" is input.

If the interruption key 314 is operated (ST11) after the adjustment value is input, the adjustment value displayed on the display portion 316 is stored at the address of the memory 84 corresponding to the code "02" (ST12) As a result, "AJ" is displayed on the display portion 316 (ST13).

In this state, if the preheat key 313 is operated, a copying operation is performed (ST14). In this case, if a predetermined document is placed on the document table 2 of the main body 1 and is actually copied, whether proper exposure is performed or not can be confirmed.

More specifically, when a copying operation is started, an adjustment value corresponding to the set 141% magnification is read out from the memory 84, and the control signals L(m) and ENL are obtained in accordance with this adjustment value. The control signals L(m) and ENL are then supplied to the reference voltage generating circuit 211, so that the analog switches are switched in accordance with the control signals L(m) and ENL. As a result, the exposure amount of the exposure lamp 4 is controlled in accordance with a set adjustment value.

If re-adjustment is required after the actual copying operation in this manner, the procedure after the step ST5 is repeated (ST15 to 5).

If the set exposure amount is determined to be proper after the actual copying operation, and "0" and "9" are simultaneously input through the ten-key pad 302, the adjustment mode is released (ST16).

Figure 9:
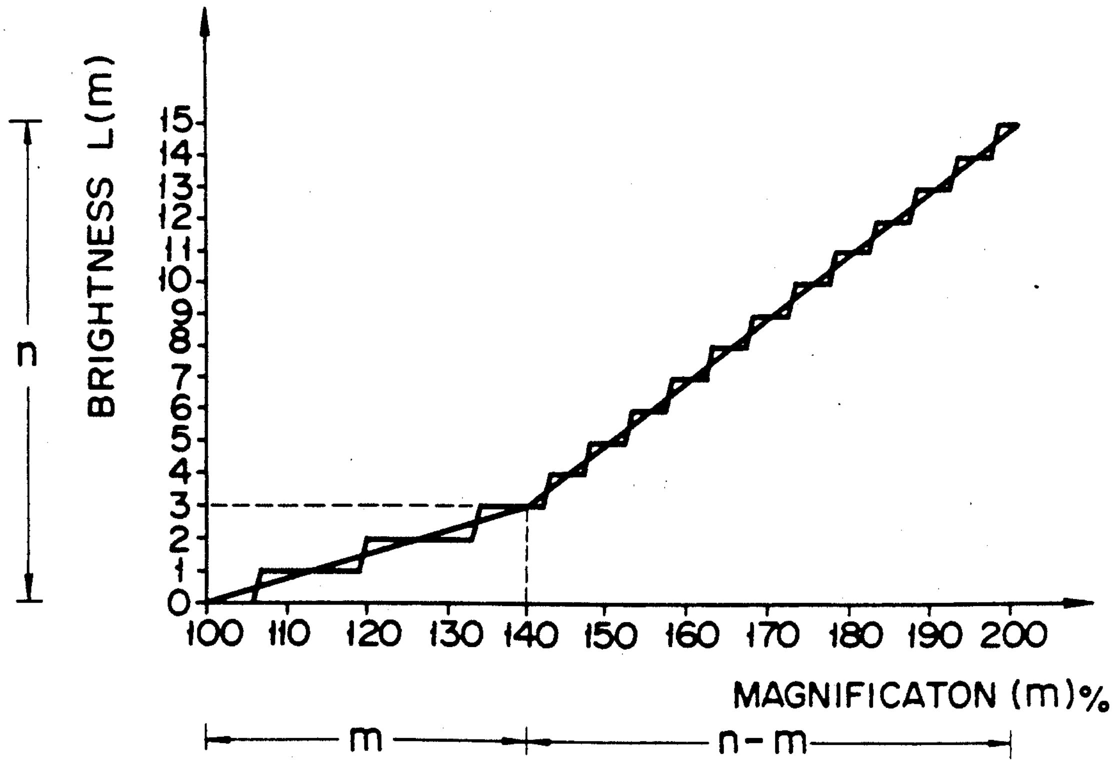
FIG. 9 is a graph for explaining a relationship between copy magnification and brightness.

As a result FIG. 9 shows exposure control characteristics from a first exposure adjustment point at one-to-one magnification (100%) to a second exposure adjustment point maximum magnification (200%) with a third exposure adjustment point at the input optimal exposure amount at the 141% magnification. More specifically, brightness corresponding to the one-to-one magnification of 100% and the maximum magnification of 200%, which are adjusted by exposure adjustment for manual exposure, are respectively set to be "0" and "15". The brightness from the one-to-one magnification of 100% to the maximum magnification of 200% are divided by a value n, which here is 16. A straight line connecting the one-to-one magnification of 100% to the maximum magnification of 200% is then bent at an adjustment value "3" corresponding to the 141% magnification. The line slope is adjusted such that the first m brightness increments are each equal, and the next n-m brightness increments are also equal.

After the adjustment for manual exposure at the 141% magnification is performed in the above-described manner, an automatic exposure mode is set by operating the automatic exposure key 317 of the operation panel 30, and the magnification is set at 141%, thereby performing automatic exposure.

If it is determined after this copying operation that exposure is not proper, exposure adjustment for automatic exposure at the 141% magnification is performed.

Figure 8:
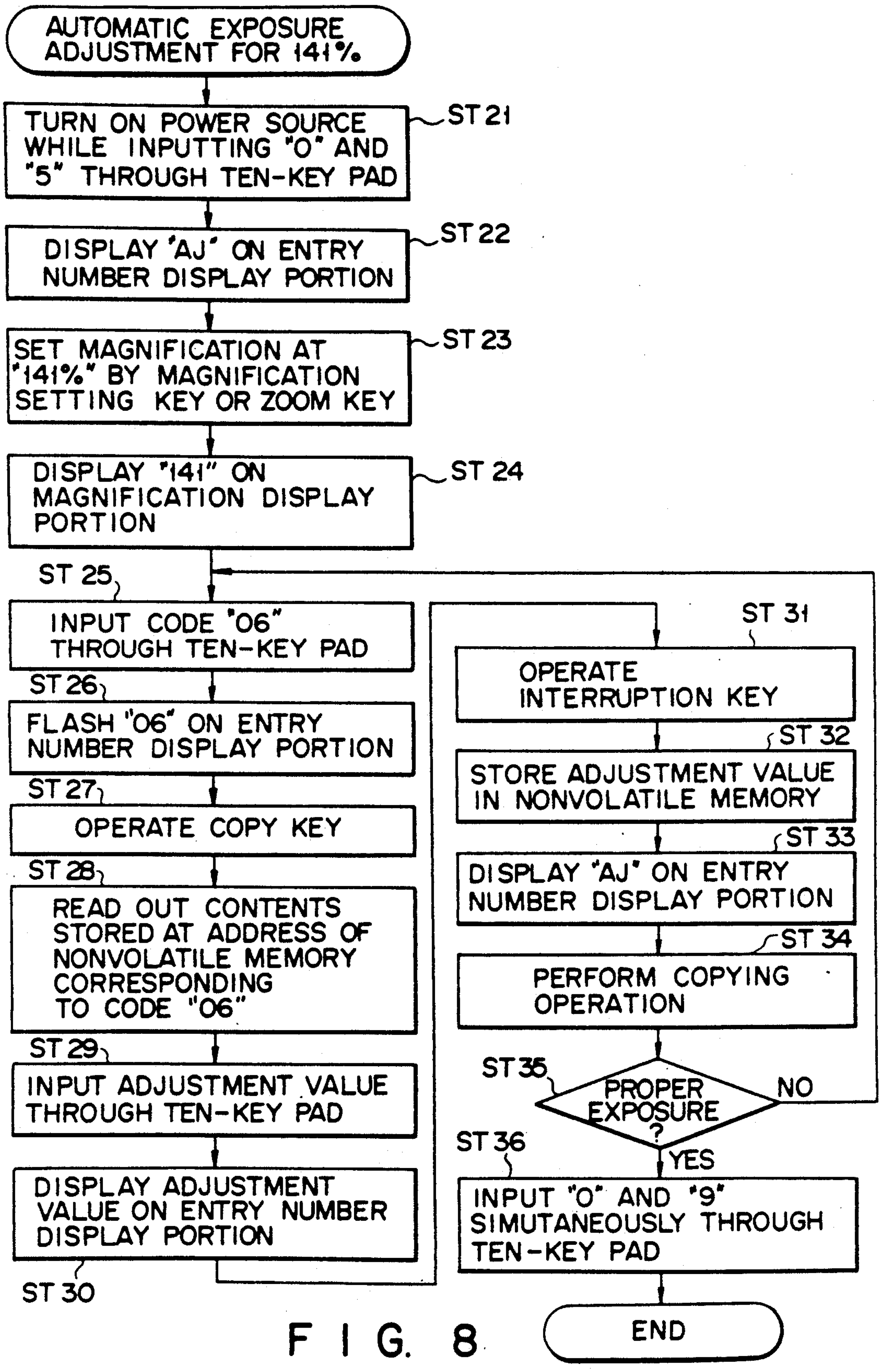

FIG. 8 is a flow chart showing a procedure for performing exposure adjustment for automatic exposure at the 141% magnification.

If the power switch 86 is turned on while the "0" and "5" keys of the ten-key pad 302 of the operation panel 30 are simultaneously depressed (ST21), the adjust mode is set (ST22). If the magnification is set at 141% by operating the magnification setting key 306 or the zoom key 307, the 141% magnification is displayed on the magnification display portion 308 (ST23, 24). When a code "06" is input through the ten-key pad 302 (ST25), the code "06" is flashed on the entry number display portion 316 (ST26).

In this state, if, for example, the copy key 301 is operated (ST27), data stored at an address of the nonvolatile memory 84 corresponding to the code "06" is read out and is displayed on the display portion 316 (ST28).

In this state, if an adjustment value "3" which is different from the displayed data is input through the ten-key pad 302 (ST29), the adjustment value is displayed on the display portion 316 (ST30).

If the interruption key 314 is operated upon input of the adjustment value (ST31), the adjustment value displayed on the display portion 316 is stored at the address of the memory 84 corresponding to the code "06" (ST32). As a result, "AJ" is displayed on the display portion 316 (ST33).

In this state, if the preheat key 313 is operated, a copying operation is performed (ST34). If readjustment is required after the actual copying operation, the procedure after step ST5 is repeated (ST35 to 25).

If it is determined after the actual copying operation that the set exposure amount is proper, and "0" and "9" are simultaneously input through the ten-key pad 302, the adjustment mode is released (ST36).

As a result, in automatic exposure, exposure control characteristics from the one-to-one magnification (100%) to the 141% magnification and from the 141% magnification to the maximum magnification (200%) are set in accordance with the input optimal exposure amount at the 141% magnification.

When a copying operation is actually performed after the above adjustment, the main processor 71 obtains the control signal L(m) corresponding to the copy magnification and the switch control signal ENL of "1" or "0" so as to control an exposure amount in accordance with the above exposure control characteristic curves, and outputs them to the lamp regulator 81.

Figure 10:
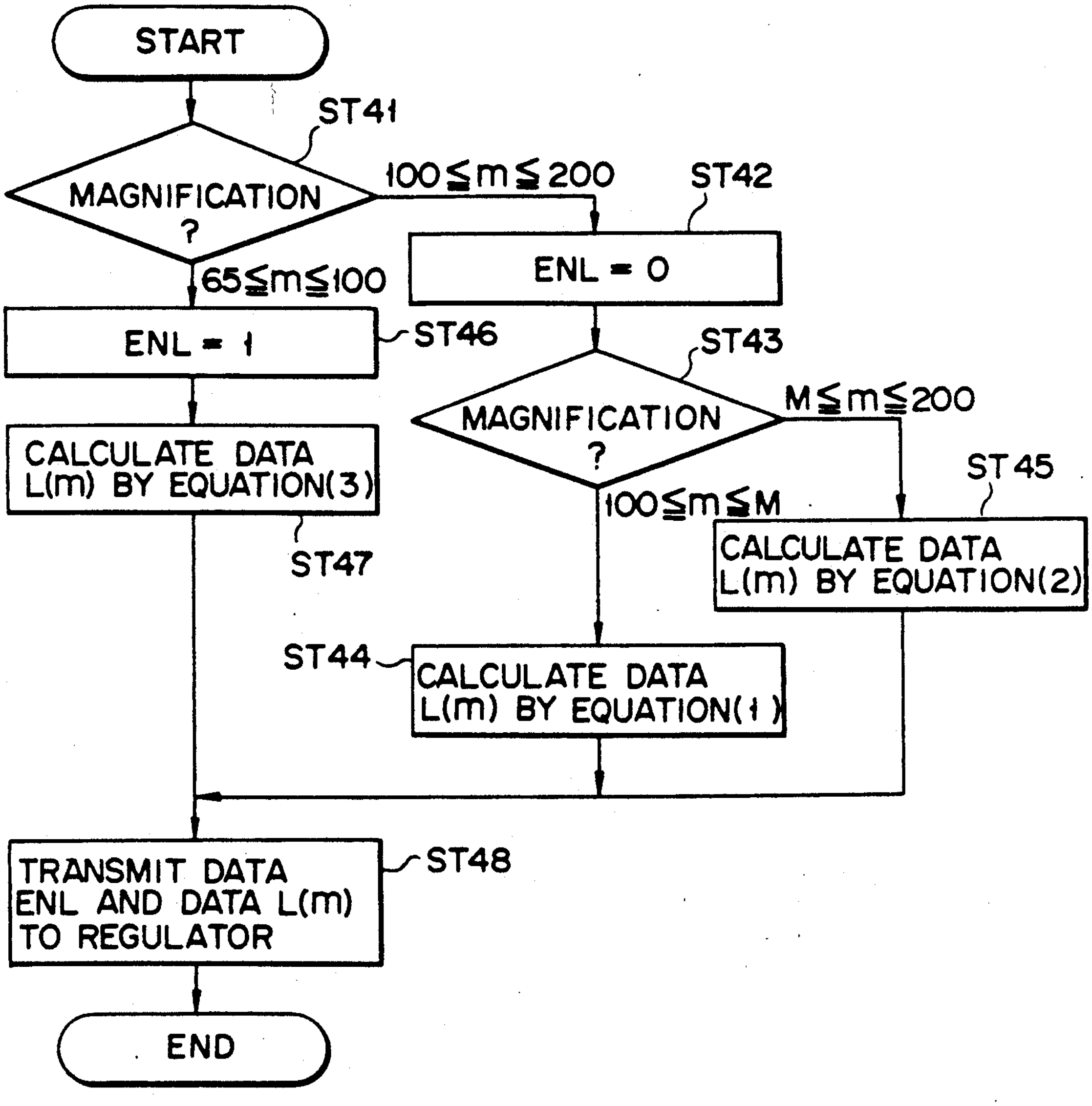
FIG. 10 is a flow chart for explaining exposure control during a copying operation.

FIG. 10 is a flow chart showing an operation of the main processor 71 in a normal copying operation.

If a copy magnification is set through the operation panel 30, the set copy magnification is checked (ST41). If it is determined that the copy magnification falls within the range between 100% and 200%, the switch control signal ENL is set at "0" (ST42). Thereafter, the set copy magnification is further checked (ST43). If the copy magnification m (%) satisfies condition $100 \leqq m \leqq M$, the data L(m) corresponding to the copy magnification m (%) is determined by equation (1) (ST44).

If the set copy magnification m (%) satisfies condition $M \leqq m \leqq 200$, the data L(m) corresponding to the copy magnification m (%) is determined by equation (2) (ST45).

If it is determined in step ST41 that the copy magnification m (%) satisfies condition $65 \leqq m \leqq 100$, the switch control signal ENL is set at "1" (ST46), the data L(m) corresponding to the copy magnification m (%) is determined by equation (3) (ST 47).

The data obtained by equation (1), (2), or (3), i.e., decimal data corresponding to the control signals B0 to B3, and the switch control signal for switching the codes "0" and "1" for enlargement and reduction copying are supplied to the serial/parallel converter 240 of the lamp regulator 81 (ST48). As a result, the analog switches comprising the digital attenuators 225 and 226, and the enlargement/reduction switch 223 are controlled through the serial/parallel converter 240, and a proper exposure amount corresponding to the copy magnification is set.

As has been described above, by setting an optimal exposure amount at an arbitrary enlargement magnification from the one-to-one magnification to the maximum magnification, exposure control operations between the one-to-one magnification and the arbitrary magnification and between the arbitrary magnification and the maximum magnification are performed in accordance with different exposure control characteristics. Therefore, by finely adjusting an exposure amount in the wide range of the one-to-one magnification to the maximum magnification, a proper exposure amount can be set in the wide range of the one-to-one magnification to the maximum magnification.

In addition, by changing data stored in the nonvolatile memory 84 while the main processor 71 is set in the adjust mode, a predetermined exposure amount can be set. Since a proper exposure amount can always be obtained at each magnification without changing an arrangement of hardware, ideal exposure control can be realized.

In the above-described embodiment, an optimal exposure amount is adjusted at the 141% magnification. However, the present invention is not limited to this. In the range of the one-to-one magnification to the maximum magnification, a magnification at which fine adjustment is performed and the number of magnifications at which fine adjustment is performed can be arbitrarily set.

Figure 17:
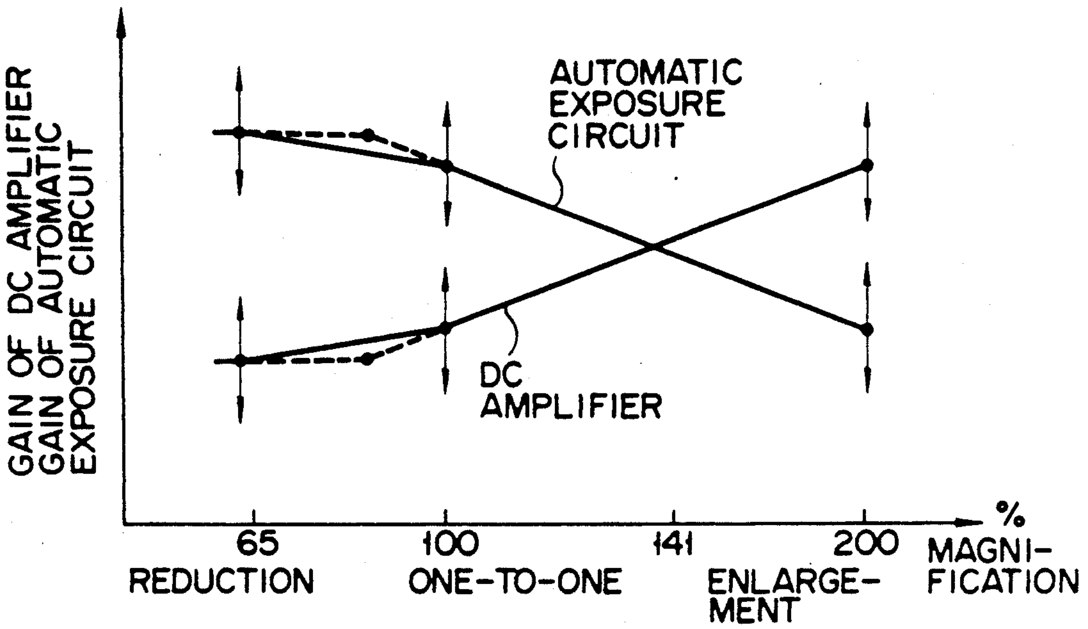
FIG. 17 is a graph for explaining exposure control.

In the above-described embodiment, the fourth exposure amount adjustment point is set at an arbitrary magnification between the one-to-one copy magnification and the maximum enlargement copy magnification. However, the present invention is not limited to this. As shown in FIG. 17, the fourth exposure amount adjustment point can be set at an arbitrary magnification between the minimum reduction copy magnification and the one-to-one copy magnification.

In addition, the above-described exposure amount adjustment can used in combination with copy magnification operations of monochromatic/color copying and automatic/manual exposure.

Various other changes and modifications can be made within the spirit and scope of the invention.

What is claimed is:

1. An exposure control apparatus of a copying machine, comprising:

means for adjusting an exposure amount at first, second and third exposure amount adjustment points respectively, the third exposure amount adjustment point being an arbitrary point which is set between the first and second exposure amount adjustment points;

first calculating means for calculating an exposure amount with a first exposure amount calculating ratio at a first arbitrary point which is between the first and third exposure amount adjustment points;

second calculating means for calculating an exposure amount with a second exposure amount calculating ratio, different from the first ratio, at a second arbitrary point which is between the second and third exposure amount adjustment points; and means for setting the third exposure amount adjustment point.

2. An apparatus according to claim 1, wherein the second exposure amount adjustment point is a one-to-one copy magnification for copying the image of the document in a real size.

3. An apparatus according to claim 2, wherein the first exposure amount adjustment point is a point from the group consisting of a minimum reduction copy magnification for copying an image of a document in a smallest reduction size and a maximum enlargement copy magnification for copying an image of a document in a largest enlargement size.

4. An apparatus according to claim 1, wherein the third exposure amount adjustment point is a one-to-one copy magnification for copying the image of the document in a real size.

5. An apparatus according to claim 4, wherein the first exposure amount adjustment point is the minimum reduction copy magnification for copying an image of a document in a smallest reduction size and the fourth exposure amount adjustment point is the maximum enlargement copy magnification for copying an image of a document in a largest enlargement size.

6. An apparatus according to claim 1, further comprising:

operation panel means for operating the apparatus, said operation panel means including said setting means.

7. An exposure control apparatus as in claim 1 wherein said first and second ratios are ratios of brightness and magnification.

8. An exposure control apparatus of a copying machine, comprising:

means for adjusting an exposure amount at first, second and third exposure amount adjustment points, respectively, the third exposure amount adjustment point being arbitrary between the first and second exposure amount adjustment points;

first calculating means for calculating an exposure amount by dividing an increased amount of the exposures between the first and second exposure amount adjustment points into n equal parts, where n is an integral number;

second calculating means for calculating an exposure amount at an arbitrary magnification by dividing the magnification between the first and third exposure adjustment points into m equal points, where m is an integral number; and third calculating means for calculating an exposure amount at an arbitrary magnification by dividing the magnification between the second and third exposure amount adjustment points into n-m equal points.

9. An apparatus according to claim 8, wherein said m is determined to be an integral number almost corresponding to said amount of exposure at the third exposure adjustment points.

10. An apparatus according to claim 8, wherein the first exposure amount adjustment point is a one-to-one copy magnification for copying an image of a document in a real size and the second exposure amount adjustment point is the enlargement copy magnification for copying an image of a document in an enlargement size.

11. An apparatus according to claim 8, further comprising fourth calculating means for calculating said amount of exposure corresponding to each of m equal intervals and said amount of exposure corresponding to each of n-m equal intervals as being respective predetermined values.

12. An exposure control apparatus of a copying machine, comprising:

means for adjusting an exposure amount at first, second and third exposure amount adjustment points respectively, the third exposure amount adjustment point being an arbitrary point between the first and second exposure amount adjustment points;

means for calculating an exposure amount so as to make the density of a formed copy-image equal at the first, second and third exposure adjustment points; and means for setting an exposure amount such that a first arbitrary point between the first and third exposure amount adjustment points has a first exposure control characteristic which is a ratio of brightness to magnification, and a second arbitrary point, between the second and third exposure amount adjustment points, has a second exposure control characteristic which is a ratio of brightness to change in magnification.

13. A method of controlling exposure in a copying machine, comprising the steps of:

adjusting an exposure amount at first, second and third exposure amount adjustment points respectively, the third exposure amount adjustment point being an arbitrary point between the first and second exposure amount adjustment points;

calculating an exposure amount with a first exposure amount calculating ratio at a first arbitrary point which is between the first and third exposure amount adjustment points; and calculating an exposure amount with a second exposure amount calculating ratio, different from the first ratio, at a second arbitrary point which is between the second and third exposure amount adjustment points.

* * * * *